US009379550B2

(12) United States Patent
Peck

(10) Patent No.: US 9,379,550 B2
(45) Date of Patent: Jun. 28, 2016

(54) METHODS, SYSTEMS AND APPARATUS FOR NATURAL POWER COLLECTION AND DISTRIBUTION

(76) Inventor: Gordon Peck, Toronto (CA)

(*) Notice: Subject to any disclaimer, the term of this patent is extended or adjusted under 35 U.S.C. 154(b) by 848 days.

(21) Appl. No.: 13/157,689

(22) Filed: Jun. 10, 2011

(65) Prior Publication Data

US 2012/0223580 A1     Sep. 6, 2012

Related U.S. Application Data

(60) Provisional application No. 61/447,979, filed on Mar. 1, 2011.

(51) Int. Cl.
| | |
|---|---|
| *H02J 1/00* | (2006.01) |
| *H02J 3/00* | (2006.01) |
| *H02J 3/38* | (2006.01) |
| *F03D 9/00* | (2016.01) |
| *F03D 11/04* | (2006.01) |
| *E04H 12/10* | (2006.01) |
| *E04H 12/24* | (2006.01) |
| *E04H 12/00* | (2006.01) |

(52) U.S. Cl.
CPC ............... *H02J 3/383* (2013.01); *E04H 12/10* (2013.01); *E04H 12/24* (2013.01); *F03D 9/005* (2013.01); *F03D 11/04* (2013.01); *H02J 3/386* (2013.01); *E04H 2012/006* (2013.01); *F05B 2240/911* (2013.01); *F05B 2240/9121* (2013.01); *Y02E 10/563* (2013.01); *Y02E 10/723* (2013.01); *Y02E 10/728* (2013.01); *Y02E 10/763* (2013.01); *Y02P 80/23* (2015.11); *Y10T 307/642* (2015.04)

(58) Field of Classification Search
CPC .... H02J 3/38; H02J 2003/388; B60L 2200/26
USPC ............ 307/69, 43, 65, 126; 340/907; 290/55
See application file for complete search history.

(56) References Cited

U.S. PATENT DOCUMENTS

| | | | |
|---|---|---|---|
| 1,866,804 A | 7/1932 | Hawley | |
| 5,855,103 A | 1/1999 | Moore | |
| 7,303,369 B2 * | 12/2007 | Rowan | F03D 3/062 415/4.2 |
| 2005/0230980 A1 * | 10/2005 | Brunet | F03D 1/00 290/44 |
| 2008/0252485 A1 * | 10/2008 | Lagassey | G07C 5/008 340/907 |
| 2009/0250938 A1 * | 10/2009 | Stone, Jr. | F03D 3/062 290/55 |
| 2010/0327657 A1 * | 12/2010 | Kuran | H02J 3/38 307/43 |
| 2011/0025070 A1 | 2/2011 | Price | |
| 2011/0177844 A1 * | 7/2011 | Lowas, III | F03D 11/04 455/562.1 |
| 2011/0194624 A1 * | 8/2011 | Yakar | H04B 3/54 375/257 |

FOREIGN PATENT DOCUMENTS

| | | |
|---|---|---|
| DE | 19532880 C1 | 11/1996 |
| DE | 10115267 A1 | 10/2002 |

(Continued)

*Primary Examiner* — Rexford Barnie
*Assistant Examiner* — Jagdeep Dhillon
(74) *Attorney, Agent, or Firm* — Birch, Stewart, Kolasch & Birch, LLP

(57) ABSTRACT

The present invention is directed to a system and method for transmitting and distributing electricity in which a transmission tower is adapted to include a natural power device for converting wind or solar energy into electricity. The natural power device is electrically connected as a source to at least one or more transmission lines connected to the transmission tower, in order to supply the converted electricity to a distribution grid. A wind turbine and/or a solar panel may be implemented as the natural power device.

39 Claims, 14 Drawing Sheets

(56) References Cited

FOREIGN PATENT DOCUMENTS

| DE | 10 2006 032387 A1 | 1/2008 |
| DE | 10 2007 059 502 B3 | 3/2009 |
| GB | 2460389 A | 12/2009 |
| WO | WO 2009/100392 A2 | 8/2000 |
| WO | WO 2009100392 A2 * | 8/2009 ............ F03D 9/002 |

* cited by examiner

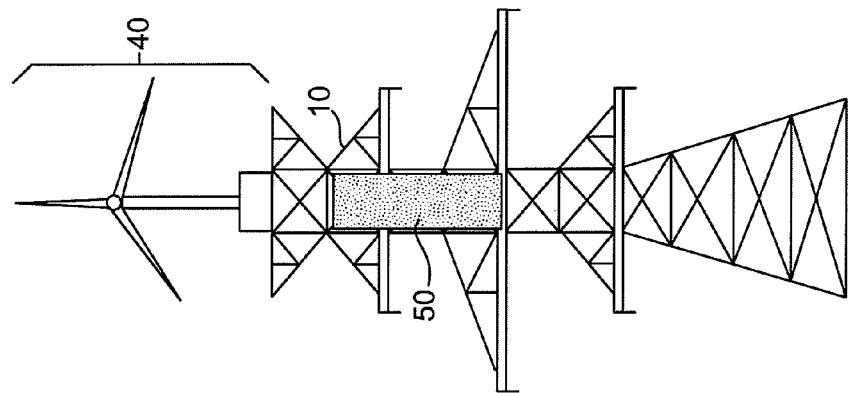
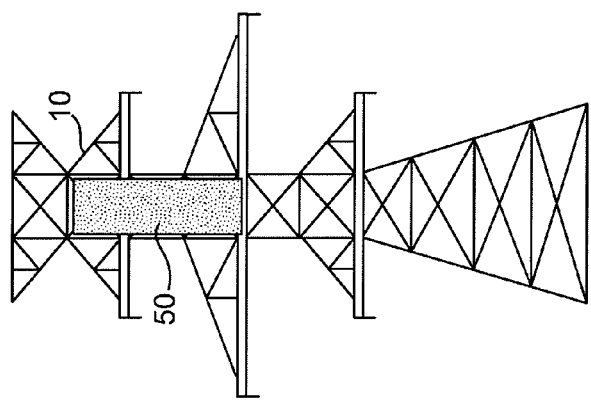
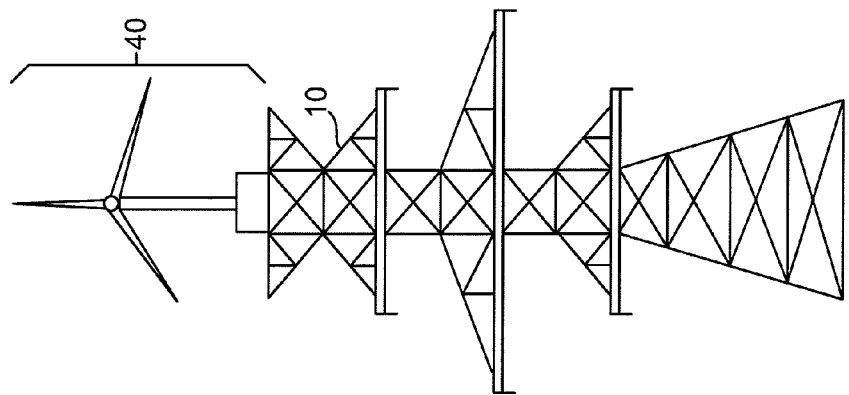
FIG. 3C
FIG. 3B
FIG. 3A

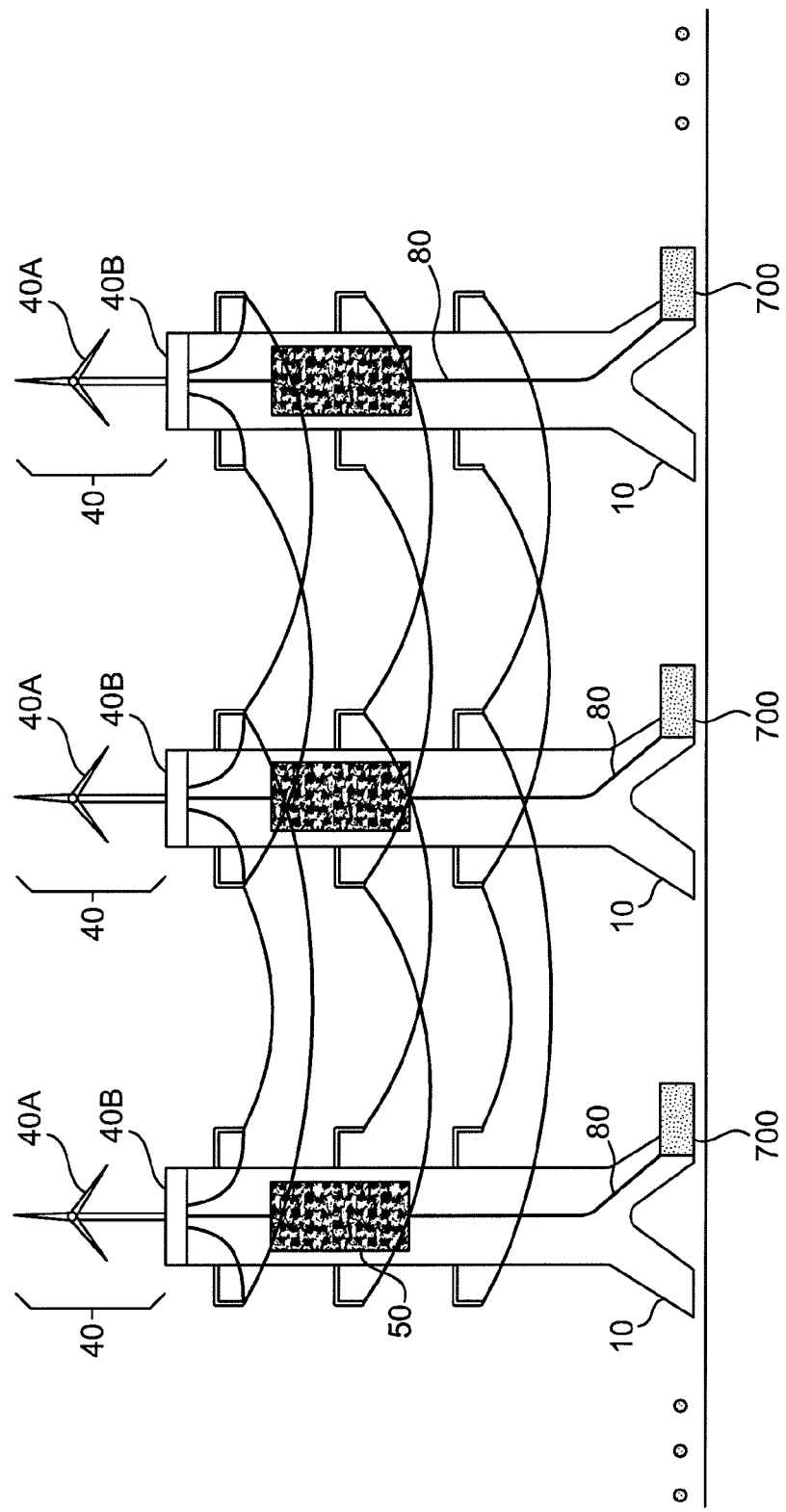

METHODS, SYSTEMS AND APPARATUS FOR NATURAL POWER COLLECTION AND DISTRIBUTION

CROSS-REFERENCE TO RELATED APPLICATION

The present application claims priority to U.S. Provisional Application No. 61/447,979 filed Mar. 1, 2011, the entire contents of which are herein incorporated by reference.

FIELD OF THE INVENTION

The present invention relates to the collection and distribution of electricity generated by natural power, and more particularly to a transmission grid adapted to convert and transmit electricity generated by one or more natural power sources attached to transmission towers within the transmission grid, where the transmission grid may be any type of transmission grid that can transmit electrical power or electrically-conducted signals such as, for example, a power grid, telephone grid or other communication grid.

BACKGROUND OF THE INVENTION

Today, there are a great number of wind farms in Canada and the United States and throughout the world, each including a number of wind turbines situated over a large area on an open field. Existing wind farms need to use underground cables, which are situated in protective shields, to transfer the electrical energy from each wind turbine to a holding area or a facility. From this facility the generated power is transferred to the electrical grid for immediate use. However, the costs associated with the construction and operation of such wind farms can be prohibitively high, thus causing certain towns/municipalities to reject proposed wind farms based on their projected costs.

Furthermore, concentrating wind farms in a few locations is not efficient use of the prevailing wind energy. If the wind is not blowing in the areas of the wind farms, or if it only blows during a specific season, then such wind farms are inefficient in providing instant wind-generated power.

In addition, the rezoning of land to allow wind farms has been an ongoing problem for wind power providers, e.g., due to noise and aesthetic concerns associated with wind farms.

Other types of power companies utilize a network of tower-like structures, sometimes referred to as "hydro towers" and "electricity pylons" (depending on which country one is in), which are connected via overhead power lines to supply electrical power from the source (e.g., hydro-electric or nuclear plant) to a distribution grid (which distributes the power throughout residential areas). In addition, telecommunications companies utilize a network of poles, which are connected by wires or cables overhead, to transmit or distribute electrically-conducted signals (voice and/or data) over large areas. These tower-like structures and poles can be collectively referred to as "transmission towers" for purposes of this specification and the accompanying claims.

Such transmission towers are widely scattered throughout many countries, and already have a right of way associated therewith. Thus, it would be advantageous if such transmission towers could also be used to collect and distribute energy derived by natural power, such as wind and/or solar power. Moreover, because these transmission towers are widely distributed, constant power can be generated whenever or wherever the wind is blowing.

SUMMARY OF THE INVENTION

Various embodiments of the present invention are directed to a system for transmitting and distributing electricity, comprising a transmission tower supporting a one or more power lines that supply electricity to a distribution grid, and a natural power device for converting wind or solar energy into electricity. In such a system, the natural power device is electrically connected as a source to at least one of the one or more power lines in order to supply the converted electricity to the distribution grid.

According to an exemplary embodiment of the present invention, the natural power device is a wind turbine.

In a further embodiment of the invention, such wind turbine may be mounted on one end of the support post extending above the transmission tower. As such, a first support plate may be mounted on the transmission tower at the top of the transmission tower, a second support plate may be mounted on the transmission tower a certain distance below the first support plate, and the support post may be mounted on the transmission tower and extend vertically through respective apertures in the first and second support plates.

Furthermore, the aforementioned support post may be anchored to the ground. Alternatively, the support pipe may not reach all the way down to ground level, but may extend downward from the wind turbine a sufficient distance for providing the necessary support to the wind turbine.

Also, in a further embodiment of the invention, an interior pipe may be provided that runs down from a generator of the wind turbine through the interior of the support post. This interior pipe may house one or more insulated wires, which are attached to the generator. These insulated wires may run down through the interior pipe to an insulated brace on the transmission tower, where one or more power lines are attached. This can provide a path whereby electricity generated by the generator can be transmitted to the one or more power lines for further transmission. For example, the one or more power lines may run from tower to tower in the transmission grid in order to transmit the natural power-converted electricity to the distribution grid.

While abovementioned embodiments are directed to a wind turbine as the natural power device, according to an alternative exemplary embodiment the natural power device may be a solar panel that is mounted on the transmission tower. In another alternative exemplary embodiment, both a wind turbine and a solar panel may be mounted on the same transmission tower (or on different towers of the same transmission grid).

Regardless of whether a wind turbine, a solar panel, or both are provided on the transmission tower, further enhancements of the system are contemplated for the present invention. For example, a battery may be installed in or proximate to the transmission tower. For instance, the battery may be provided at or near a transmission tower in order to power the natural power device(s) mounted thereon, as well as possibly other natural power devices mounted on other towers. However, such battery may have an alternative (or additional) function of storing electricity converted by the natural power device(s), e.g., during off-peak hours.

As another example, the various natural power devices, which are installed on the towers of a transmission grid, may be controlled selectively and individually by a computer system. Also, a camera may be mounted on a transmission tower in addition to the natural power device(s), to transmit images of the natural power device(s) to the computer system for purposes of monitoring.

As mentioned above, a battery functioning as an electricity storage device may be installed at or proximate to a transmission tower. It is also possible, however, to install an electricity storage device at an existing facility, e.g., substation, within an electrical distribution grid to store electricity converted by the natural power devices, e.g., during off-peak hours.

Another exemplary embodiment of the present invention is directed to a method of obtaining and distributing electricity converted from natural power, using the aforementioned system. Furthermore, according to such method, the natural power devices may be distributed intermittently along the transmission grid, e.g., one on every N-th tower (N>1).

The aforementioned summary is illustrative only and not intended to any way be limiting on the present invention. Other aspects and features of the invention will become apparent from the Detailed Description that follows. This summary is not intended to identify key or essential features of the claimed invention, nor is it intended to be used as an aid in determining the scope of the claimed invention.

BRIEF DESCRIPTION OF THE DRAWINGS

Various features of the present invention will become more fully apparent from the present specification and claims, when viewed in conjunction with the accompanying drawings as described below.

FIGS. 3A-3C illustrate exemplary embodiments in which a wind turbine and/or a solar panel may be installed as a natural power device on a transmission tower;

FIGS. 7A and 7B illustrate exemplary embodiments in which an electricity storage device may be used to store electricity generated by a natural power device.

DETAILED DESCRIPTION

Figure 1A:
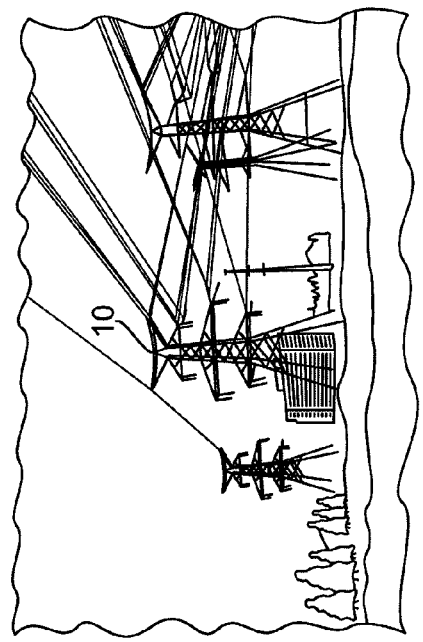
FIGS. 1A-1D illustrate different types of transmission towers on which a natural power device may be installed according to exemplary embodiments.

In the following detailed description, reference is made to the accompanying drawings. In the drawings, similar reference numbers will be used to refer to similar components. This detailed description, as well as the drawings, are intended to illustrate various aspects and features of the invention by way of detailed examples. However, such examples are not intended to be limiting, and the present invention encompasses any and all variations of the examples described herein that would be contemplated by persons of ordinary skill in the art.

This disclosure is drawn, inter alia, to the adaptation of a transmission tower of a transmission grid to be used for converting natural power (e.g., wind or solar power) into electricity, and transmitting the converted electricity via the transmission grid to an electrical distribution grid. Particularly, such transmission tower is adapted to physically support, or otherwise be connected to, a natural power device which performs the actual conversion of natural power into electricity. Examples of such natural power devices include wind turbines and solar panels.

The transmission tower may be an existing type of structure used by a power company to transmit electrical power overhead (e.g., hydro-electric tower or electricity pylon). However, the transmission tower could also be one used by another type of utility like a telecommunications company. For instance, a telephone pole could be adapted according to principles of the present invention.

Various aspects and embodiments of the present invention are described hereinafter in connection with the particular example where the transmission tower corresponds to a type used by a power company to transmit electrical power. However, it should be understood that such aspects and embodiments are further applicable (or could be modified to apply) to other types of transmission towers, e.g., telephone poles or other types of utility poles.

Figure 1B:
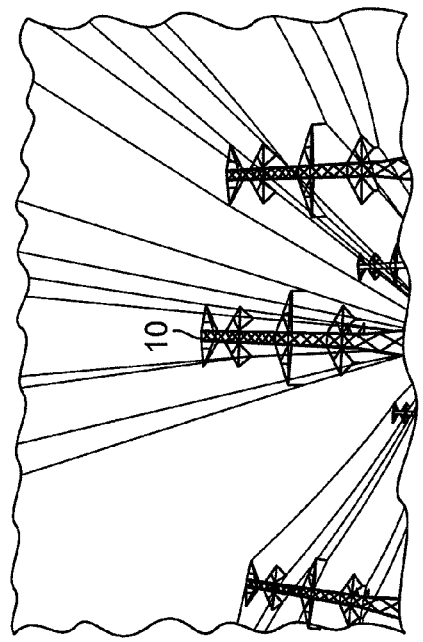
Figure 1C:
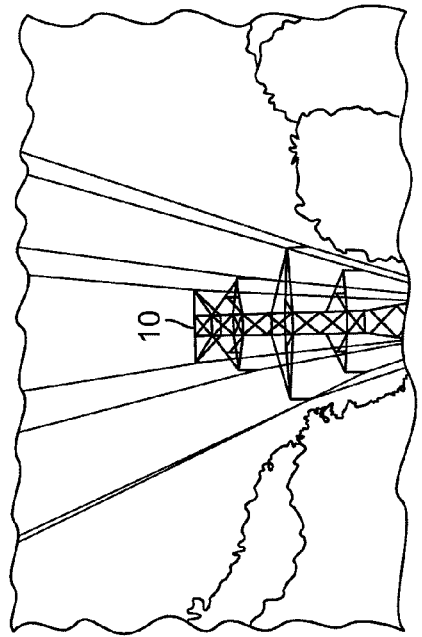

FIGS. 1A-1D illustrate examples of different types of transmission towers 10 on which a natural power device may be installed according to exemplary embodiments of the present invention. For example, the frames of the transmission towers 10 of FIGS. 1A and 1D extend relatively straight down from the top for some distance, and then flare out gradually to the ground to create stability for the tower 10. In other types of towers 10, however, the frames may flare out gradually from the top as illustrated in FIGS. 1B and 1C.

It should be noted that FIGS. 1A-1D are not intended to illustrate all of the types of transmission towers 10 that can be used in connection with the present invention. It will be readily apparent to persons of ordinary skill in the art that many other types of transmission towers which are currently in use, as well as obvious variations of such towers, may be used in connection with the present invention.

Figure 1D:
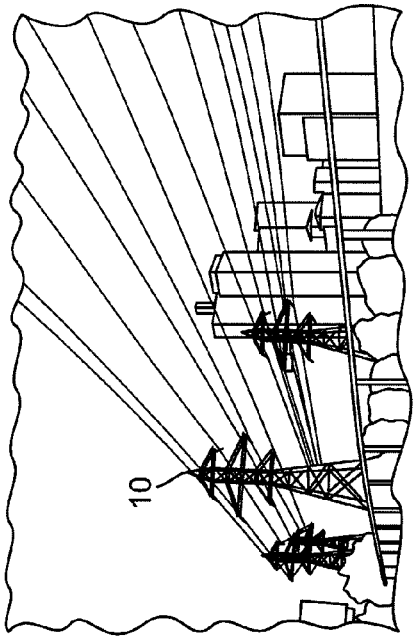
Figure 2:
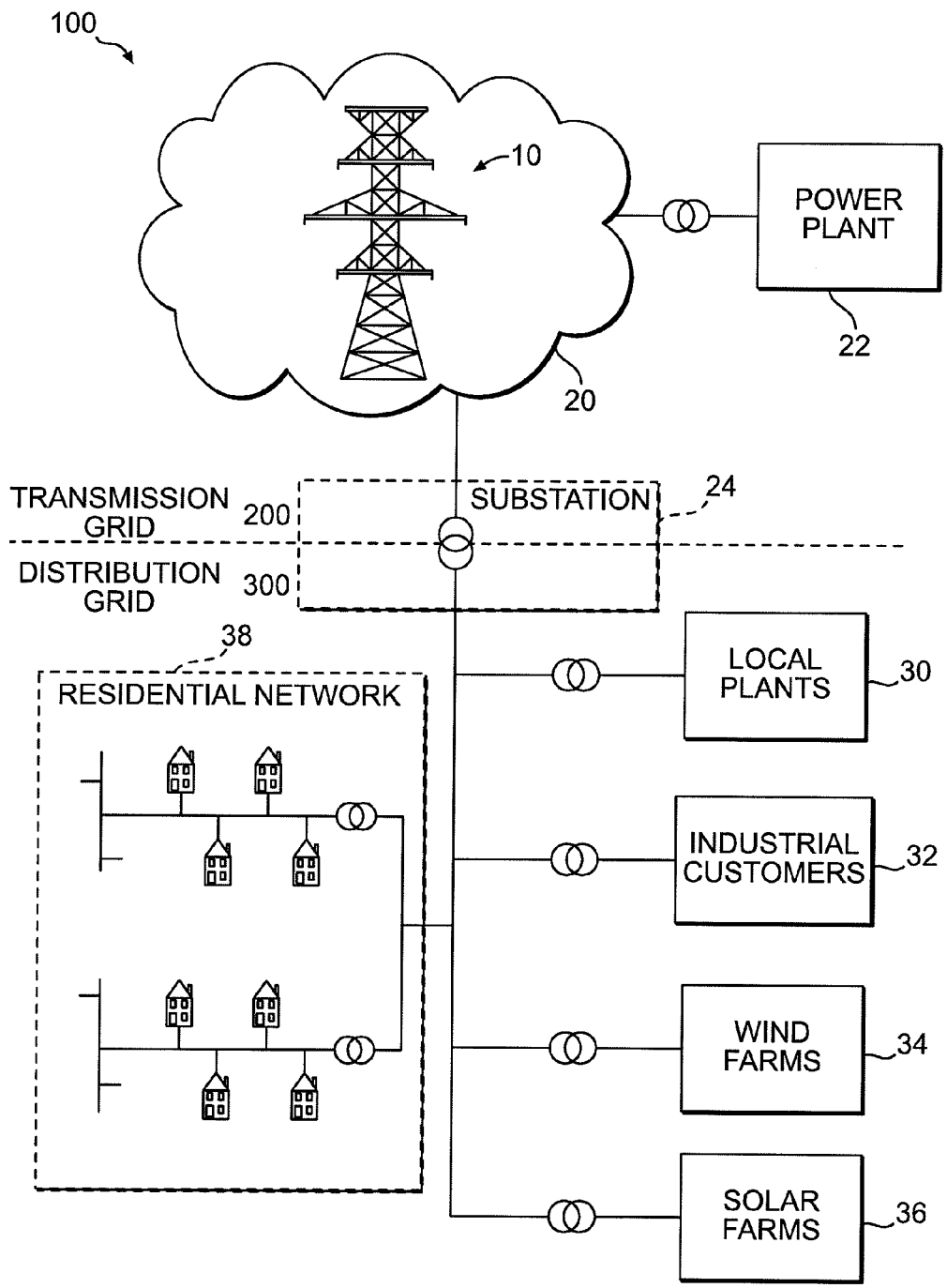
FIG. 2 illustrates an electrical grid including a transmission grid and distribution grid in which exemplary embodiments of the present invention could be implemented.

Further, each type of transmission tower shown in FIGS. 1A-1D may be implemented in an electrical grid as illustrated in FIG. 2. As shown in FIG. 2, the electrical grid 100 includes a transmission grid 200 and a distribution 300 grid. The transmission grid 200 includes the transmission network 20, i.e., a network of transmission towers 10. In this transmission network 20, power lines run from tower to tower to transmit the electricity generated by the power plant 22 to the distribution grid 300. As illustrated in FIG. 2, the electric power which is generated by the power plant 22 may be stepped up to a higher voltage level for transmission via the towers 10 in the transmission network 20. The power plant 22 may be any one of a number of different types of plants including, but not limited to, hydro-electric plants, nuclear power plants, coal plants, etc.

In addition to the power lines transmitting the electricity generated by power plant 22, the transmission network 20 may include one or more power lines for transmitting electricity converted from natural power sources (e.g., wind or solar power) according to exemplary embodiments of the present invention. The methods and apparatuses used for collecting such electricity and transferring it to the aforementioned power lines will be described in greater detail below in connection with other drawings.

Referring again to FIG. 2, the substation 24 receives the electrical power from the transmission network 20, and transfers the power to electric posts (not shown) or an underground distribution system (not shown) within the distribution grid 300. One of the functions of the substation 24 is to step-down the power to an appropriate level for the distribution grid 300.

The substation 24 could optionally be adapted to provide additional functionality in accordance with one embodiment of the present invention, as will be described in greater detail below in connection with other drawings.

In the distribution grid 300 of FIG. 2, the electrical power may be distributed to industrial customers 32 (e.g., factories), a residential network 38 and/or other types of customers, the voltage level being stepped-up as needed. Also, the distribution grid 300 may have additional sources to supplement the distributed power such as local power plants 30, wind farms 34, and solar farms 36.

As mentioned above, exemplary embodiments of the present invention are directed to a transmission tower 10 which is adapted to include a natural power device connected thereto, to collect electricity from natural power sources (e.g., wind or solar power). FIGS. 3A-3C illustrate particular exemplary embodiments in which a wind turbine and/or a solar panel are installed as natural power device(s) on a transmission tower 10.

For instance, according to an exemplary embodiment as illustrated in FIG. 3A, a wind turbine 40 is mounted on top of a transmission tower 10. Even though a simplified representation of the wind turbine 40 is used in FIG. 3A (as well as other accompanying drawings), it encompasses all constituent components that are necessary to convert wind energy to electricity including vanes (wind blades), rotor, generator, and housing.

FIG. 3B illustrates another exemplary embodiment in which a solar panel 50 may be mounted on the side of a transmission tower 10. Furthermore, FIG. 3C shows another exemplary embodiment in which both a wind turbine 40 and a solar panel may be mounted on the same transmission tower 10.

It is noted that all three embodiments illustrated in FIGS. 3A-3C, respectively, could even be implemented in the same transmission network 20 of an electrical grid 100. For instance, every N-th transmission tower 10 along each branch in the transmission network 20 may be adapted to include a wind turbine 40, while a solar panel 50 may be installed on every M-th transmission tower 10 along the same branch (M and N are different integers greater than 1). Alternatively, it is possible that the transmission towers 10 within a particular transmission network 20 are adapted according to only one of the embodiments illustrated in FIGS. 3A-3C, and such towers 10 may or may not be interspersed among other transmission towers 10 that do not have a natural power device.

Furthermore, in each embodiment that is illustrated in FIGS. 3A-3C, any of a variety of existing types of wind turbines 40 and/or solar panels 50 may be used, as the specific needs and availability dictates. The type chosen may be dependent upon the characteristics of the transmission tower 10 being used (e.g., strength and dimensions). As to wind turbines 40, for example, it would naturally be advantageous to pick a type whose generator produces the greatest amount of power, but is also able to sit safely atop the transmission tower 10.

Modifications to such wind turbines 40 and/or solar panels 50 may be necessary to attach them to the transmission tower 10. Persons of ordinary skill in the art will be readily able to design an implement such modifications.

It is noted that the embodiments of FIGS. 3A-3C are illustrated as being implemented on transmission towers 10 having a square top, similar to the types of towers illustrated in FIGS. 1A and 1D. However, it is also possible to utilize a transmission tower 10 which gradually flare out from the top, as shown in FIGS. 1B and 1C. Furthermore, modifications may be made to the transmission tower 10 to make it more suitable for supporting a natural power device (e.g., wind turbine 40 and/or solar panel 50). For instance, some types of towers 10 (such as the one shown in FIG. 1C) may have a decorative metal ornament which should be removed before installing a wind turbine 40 thereon. Any necessary or desirable modifications to the transmission tower 10 to make it well-suited for exemplary embodiments of the present invention are well within the skill level of persons of ordinary skill in the art.

Next, embodiments in which a wind turbine 40 is mounted onto a transmission tower 10 (as illustrated in FIGS. 3A and 3C) will be described. FIGS. 4A-4D illustrate various elements that can be used to support a wind turbine 40 on the transmission tower 10 according to exemplary embodiments. It should be noted that FIGS. 4A-4D are provided to broadly illustrate various principles of the present invention. As such, the figures are not intended to accurately reflect the relative sizes, thicknesses, and other dimensions of the components illustrated therein. It will be readily apparent to those of ordinary skill in the art, without undue experimentation, how to determine the relative sizes and dimensions for such elements as necessitated by the particular transmission tower 10 and wind turbine 40 being used, as well as other appropriate parameters.

Figure 4A:
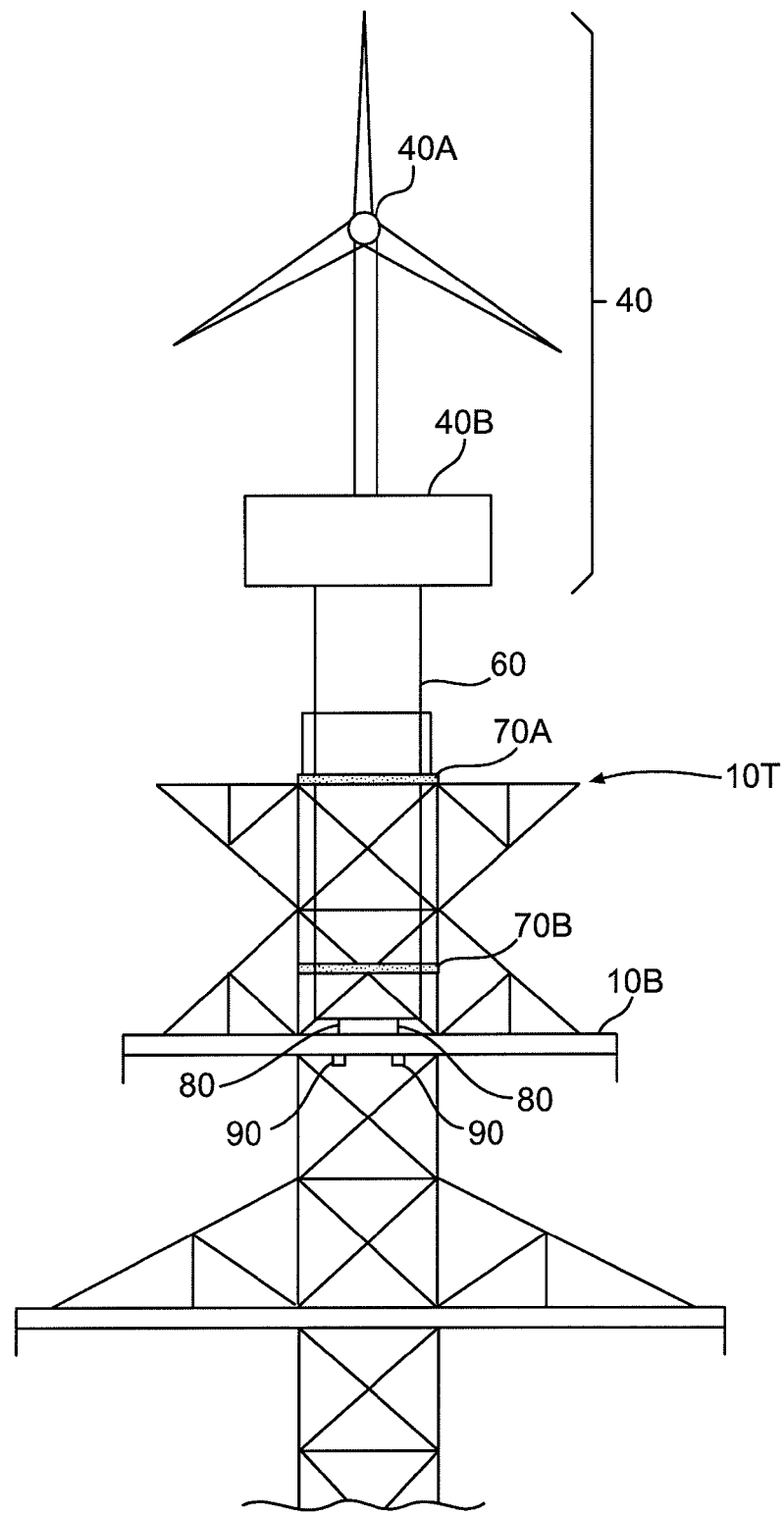
FIGS. 4A-4E illustrate various elements that can be used to support a wind turbine on the transmission tower according to an exemplary embodiments.
Figure 4B:
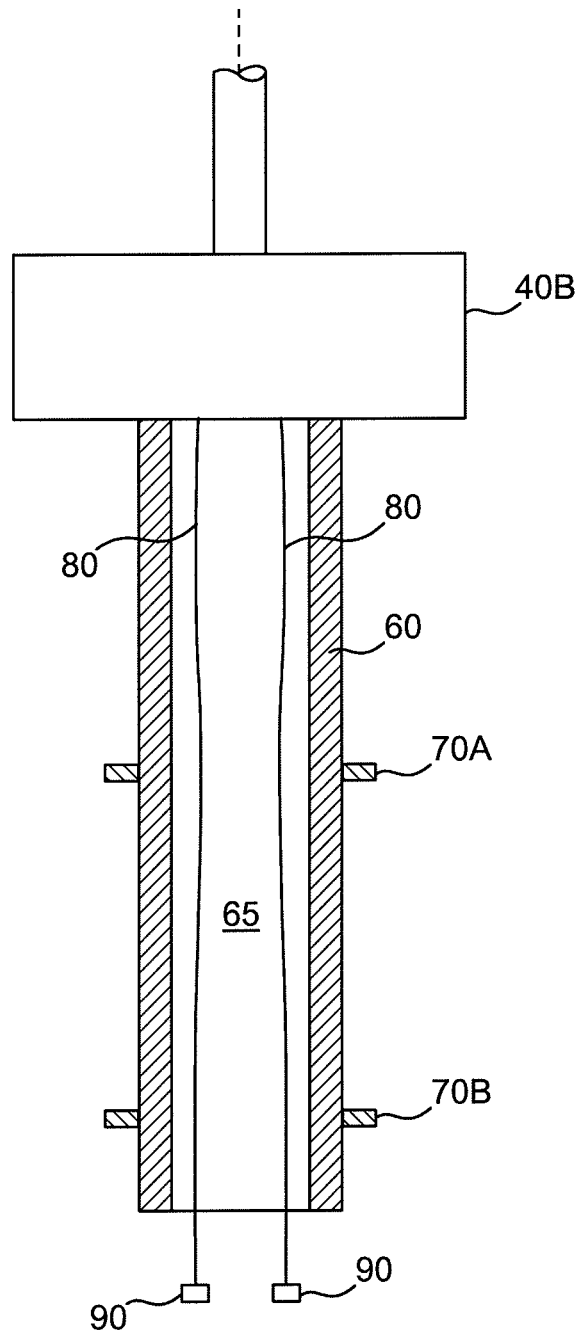
Figure 4C:
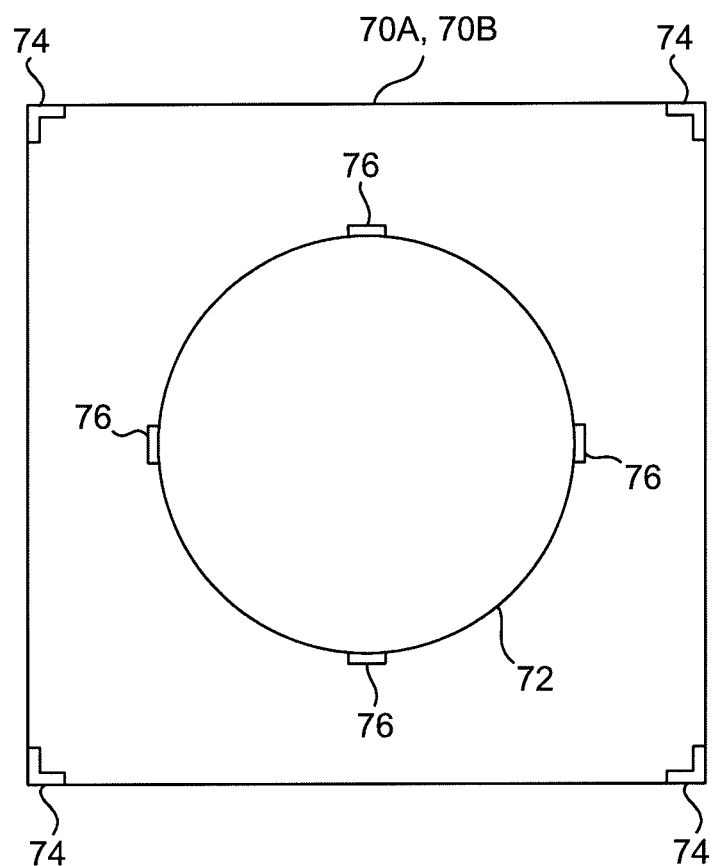
Figure 4C:
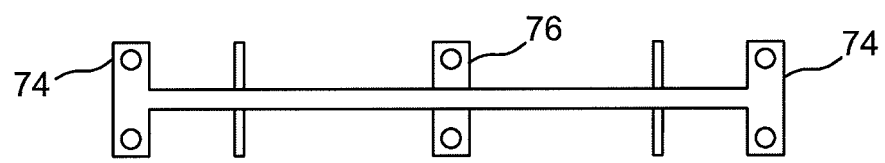

It is noted that FIG. 4A illustrates a particular example in which the generator 40B of the wind turbine 40 is located at the base, underneath the wind blades 40A and rotor. However, this is but one example of a configuration of the wind turbine 40. For instance, the wind turbine 40 could be alternatively configured to incorporate generator 40B in the head unit which holds the wind blades 40A and rotor, as illustrated in FIG. 4E. Various exemplary embodiments will be described below in connection with the configuration of FIG. 4A, but such embodiments can be modified to fit the alternative configuration in FIG. 4E or any other configuration or type of wind turbine 40.

As shown in FIG. 4A, a support post 60 and support plates 70A and 70B may be provided to support the wind turbine 40 and its elements including wind blades 40A and generator 40B. Particularly, the wind turbine 40 may be mounted on top of the support post 60, which extends above the top 10T of the tower 10. The support post 60 may comprise a pipe or other hollow structure made of metal (or another material of similar strength/properties). The support post 60 is supported by the support plates 70A and 70B, which in turn are mounted to the frame of the transmission tower 10. As shown in FIG. 4A, the support plate 70A may be mounted on the transmission tower 10 at the top thereof 10T, while the other support plate 70B is mounted some distance (e.g., 10 feet) below the support plate 70A.

According to an exemplary embodiment, the support post 60 may maintain the same diameter or width along its entire length, thus differing from the conventional post that is required to support a wind turbine at a wind farm which broadens out as it nears the ground.

The support plates 70A, 70B may also be made of metal or another material of similar strength/properties so as to provide sufficient support for the support post 60. FIG. 4C illustrates a planar view and side view of the support plates 70A, 70B. As shown in this figure, each support plate 70A, 70B may include an aperture 72 into which the support post 60 may be inserted. In addition, FIG. 4C illustrates that each support plate 70A, 70B may include tabs 74 including holes to be used for bolting (or otherwise mounting) the plate 70A, 70B to the frame of the transmission tower 10. Also, each support plate 70A, 70B may also contain tabs 76 at the edge of the aperture 72, such tabs 76 similarly having holes to be used for bolting (or otherwise mounting) the plate 70A, 70B to the support post 60.

In an exemplary embodiment, one or more insulated wires 80 may be run down from the generator 40B of the wind turbine 40, through the interior of the support post 60, to respective terminals 90 on an insulated brace 10B. According to an exemplary embodiment as shown in FIG. 4B, another pipe 65 (hereafter "generator pipe") may be attached or mounted to the generator 40B, and inserted into the interior of the support post 60. For instance, if a pipe is used as the support post 60, the generator pipe 65 will be a smaller diameter pipe.

FIG. 4B illustrates a cross-section of the support post 60, support plates 70A and 70B, and the generator pipe 65. As shown in FIG. 4B, each insulated wire 80 may run down the length of generator pipe 65, in order to transmit the electrical power produced by the generator 40B to the corresponding terminal 90. In turn, the terminals 90 may be electrically connected to power lines (not shown) which run from transmission tower 10 to transmission tower 10. As a particular non-limiting example, the generator pipe 65 may have a length of 8.5 meters and a diameter of 25.4 centimeters.

One exemplary embodiment (e.g., as shown in FIG. 4A) contemplates the support post 60 extend downward from the wind turbine 40 some distance before reaching the ground. Particularly, in this embodiment, the length of the support post 60 may be only that which is necessary to provide adequate support depending on the weight and dimensions of the wind turbine 40 used (as will be readily ascertainable by persons of ordinary skill in the art). In a particular non-limiting example, the wind turbine 40 may be such as to comprise three wind blades 40A, each blade having a length of 2 meters or more. Also, the color of the wind turbine 40 can be chosen based on various design considerations. For instance, the wind turbine 40 may be colored white in order to make it easily seen from the air, e.g., by helicopter pilots, etc. On the other hand, if the wind turbine 40 is instituted on a transmission tower 10 near a residential area, it may be colored a dark color (e.g., black) to make it less disruptive to the aesthetics of the neighborhood.

Figure 4D:
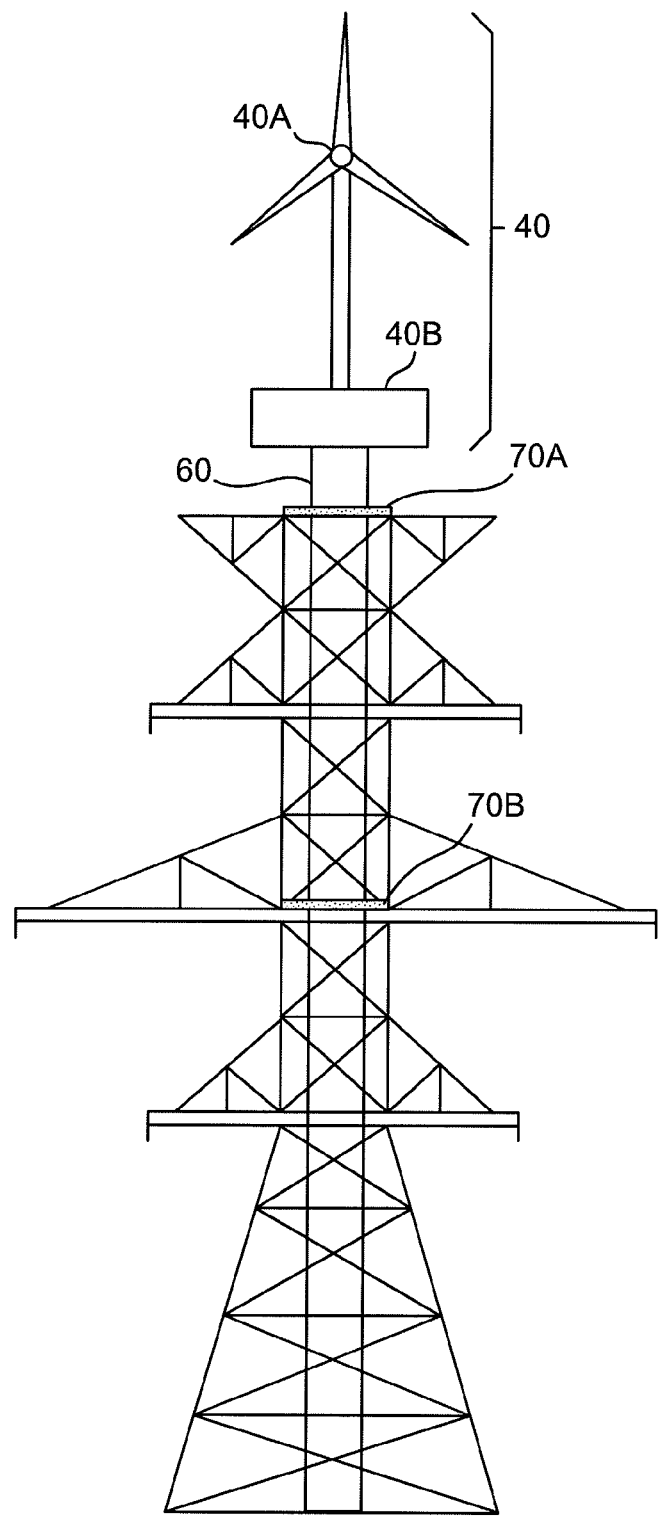
Figure 4E:
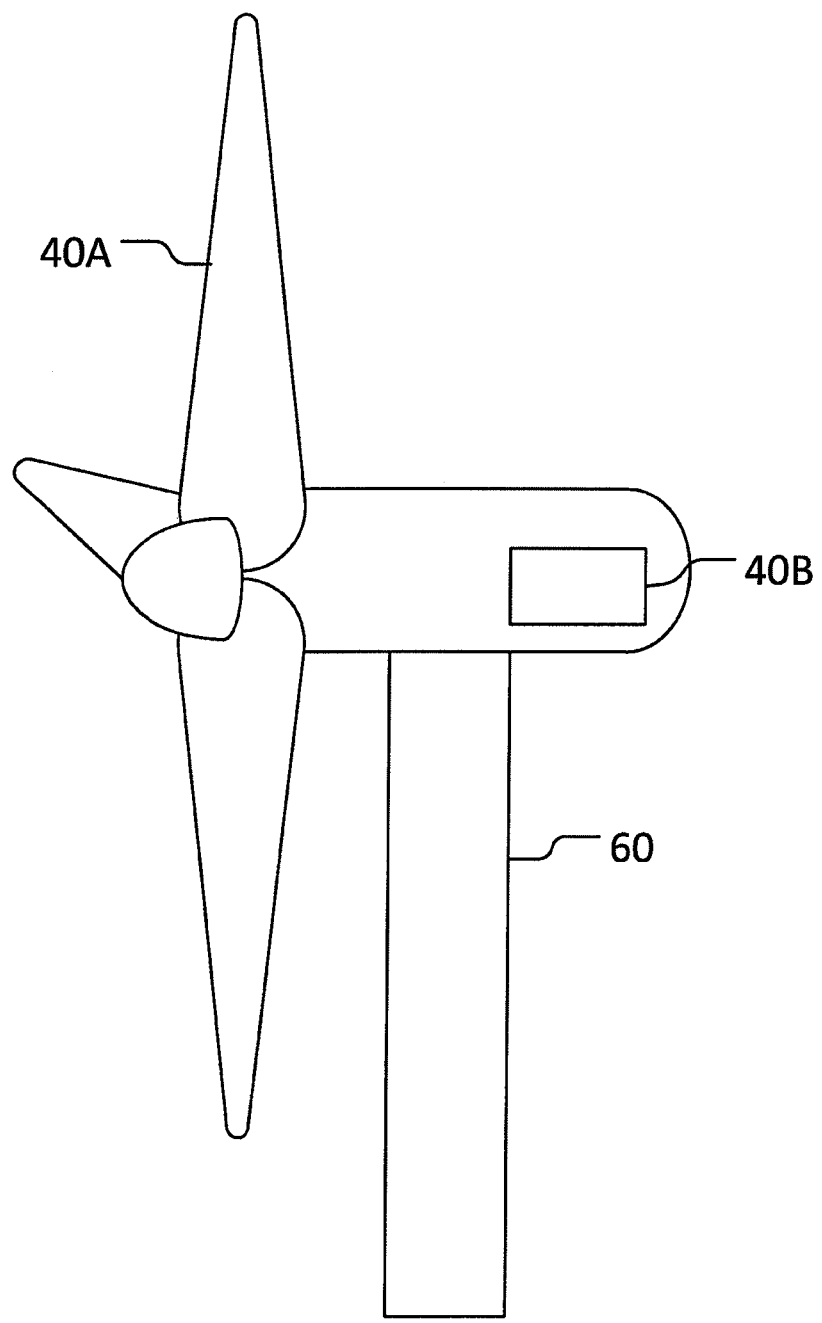

However, in an alternative exemplary embodiment, the support post 60 may extend all the way down, and be anchored to, ground level as illustrated in FIG. 4D. This alternative embodiment provides the possibility of using a type of wind turbine 40 having larger wind blades 40A and higher-power generators 40B. In this alternative embodiment, the positions of the support plates 70A and 70B may be determined, as necessary, to provide sufficient support. Further, as the support post 60 may have holes or an opening proximate to the insulated brace 10B, to allow the one or more insulated wires 80 to exit the post 60 to the respective terminals 90.

Furthermore, although exemplary embodiments as shown in FIGS. 4A-4D contemplate mounting a wind turbine 40 as a natural power device above the top 10L of a transmission tower 10, this need not always be the case. The wind turbine 40 may be mounted at other locations of the transmission tower 10 that would allow for operation in providing power.

As mentioned above in connection with FIG. 3C, according to a particular exemplary embodiment, a transmission tower 10 may include a solar panel 50 as a natural power device in addition to a wind turbine 40. As such, it would be possible to modify the transmission tower 10 illustrated in FIG. 4A or 4D to further accommodate such a solar panel 50, e.g., mounted on the side of the tower 10. For instance, an insulated wire 80 running down the generator pipe 65 may be modified to join the electrical output of the solar panel, before it is connected to the corresponding terminal 90 to be transmitted via the power lines from tower 10 to tower 10 in the transmission network 20. Of course, it is not required for the solar-generated electrical power to be transmitted from the transmission tower 10 using the same power line as the wind-generated electrical power; different power lines could be used instead.

However, as mentioned above in connection with FIG. 3B, another possible embodiment of the invention is to forego the wind turbine 40, and instead install a solar panel 50 as the only natural power device on the transmission tower 10. In such an embodiment, the electrical power may be conveyed from the solar panel 50 to an insulated brace, and transmitted from the tower 10 via a power line connected to such brace, using such means that will be readily apparent to a person of ordinary skill in the art in view of this Detailed Description.

Figure 5A:
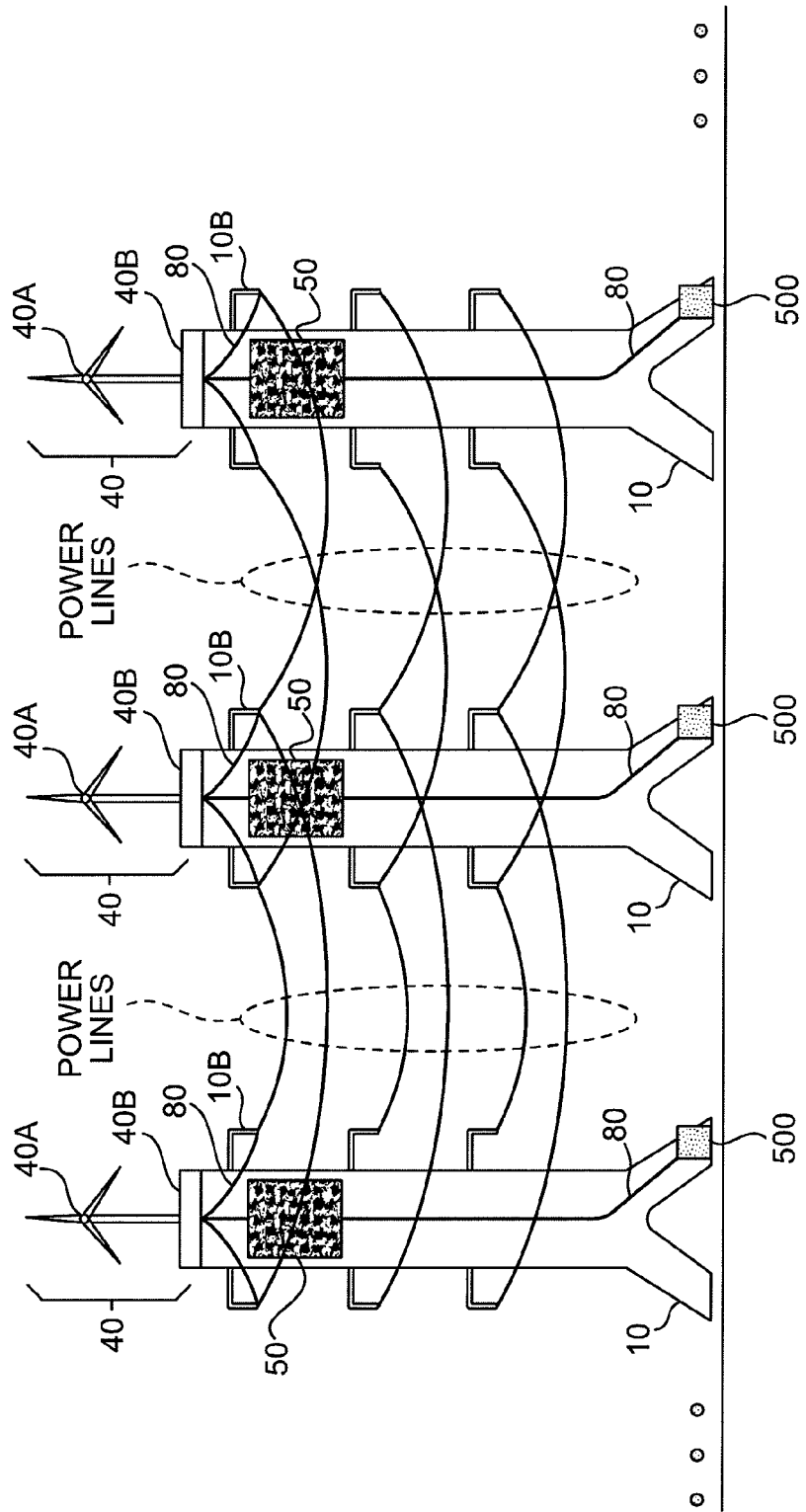
FIGS. 5A and 5B illustrate exemplary embodiments in which a natural power device is powered by a battery installed at a transmission tower.
Figure 5B:
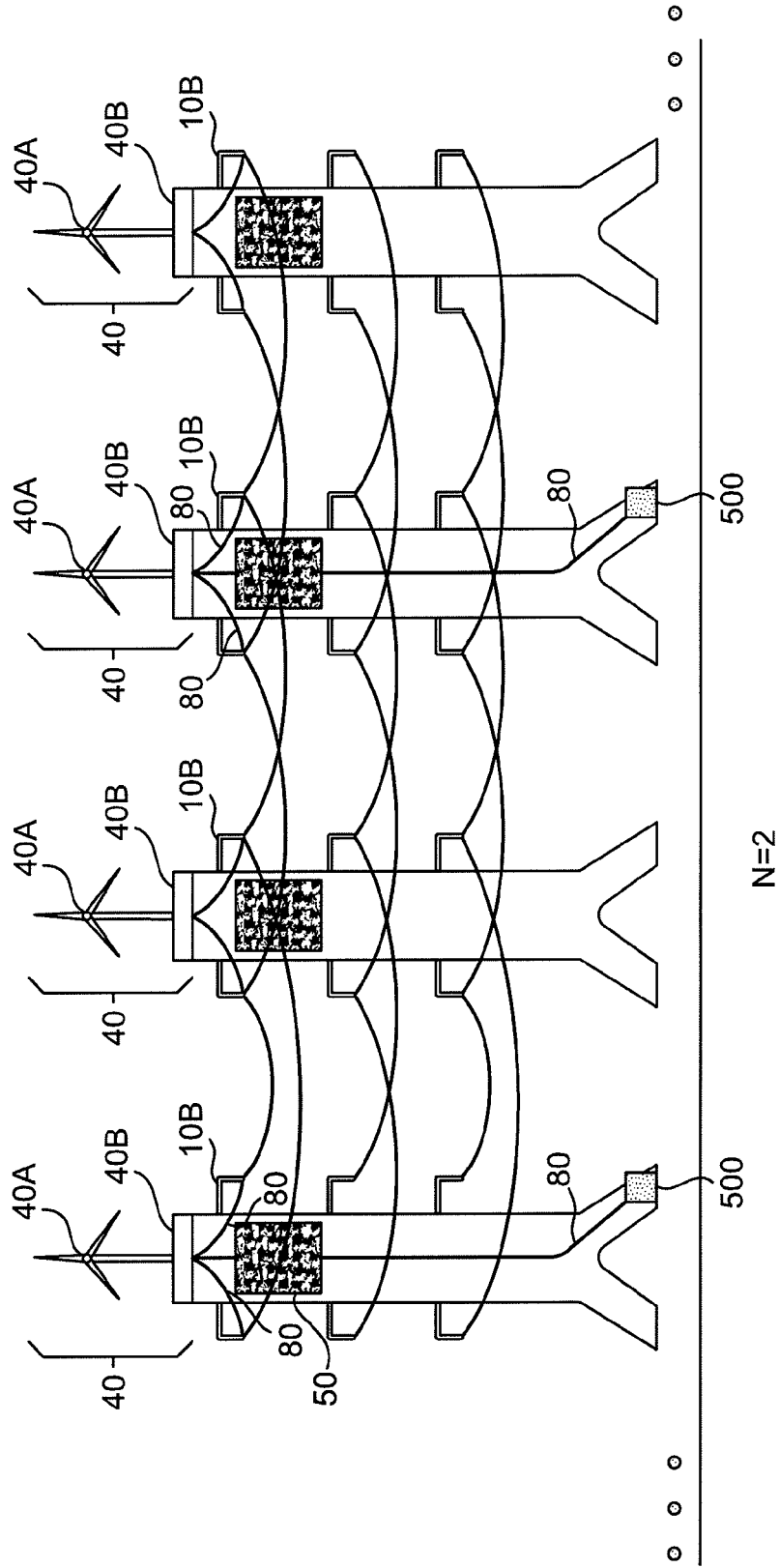

Regardless of whether a wind turbine 40, a solar panel 50, or both are installed on a transmission tower 10 as a natural power device, according to a further embodiment of the present invention, a battery may be installed at the tower 10 in order to power such natural power device(s). FIGS. 5A and 5B illustrate exemplary embodiments in which a natural power device is powered by a battery installed at a transmission tower 10. These figures show, for purposes of example, simplified representations of a series of transmission towers 10 each of which include both a wind turbine 40 and a solar panel 50 as natural power devices.

As shown in FIG. 5A, a battery 500 may be installed at each of the towers 10 in order to power the wind turbine 40 and/or solar device 50. Such battery 500 may have an alternative (or additional) function of storing electricity converted by the wind turbine 40 and/or solar device 50, e.g., during off-peak hours. As such, an insulated wire 80 may run from the battery 500 to the wind turbine 40 and/or solar device 50. For instance, this wire 80 may comprise one of the aforementioned insulated wires 80 which runs down from the wind turbine 40. The same insulated wire 80 may connect the battery 500 to both the wind turbine 40 and the solar device 50 as shown in FIG. 5A, or alternatively separate insulated wires 80 may run from the battery 500 to the wind turbine 40 and solar panel 50, respectively.

As an alternative to the configuration of FIG. 5A, FIG. 5B illustrates another exemplary embodiment where a battery 500 is installed at every N-th transmission tower 10 (N being an integer greater than 1) along each branch of the transmission network 20. FIG. 5B shows a particular example in which the battery 500 is installed at every second (2nd) transmission tower 10 (i.e., N=2) along the path. However, the electrical power from each battery 500 in FIG. 5B may also contribute to powering (or storing power from) the wind turbine 40 and/or solar panel 50 on other towers 10 without a battery 500.

It is noted that the batteries 500 illustrated in FIGS. 5A and 5B are shown as being installed at the base of their respective transmission towers 10. However, alternative locations may be used. For example, a battery 500 may be mounted somewhere on the tower 10, e.g., in proximity of the natural power device which is being powered. Further, it is possible that multiple batteries 500 may be mounted on, or installed at, a particular transmission tower 10. For example, separate batteries 500 may be installed in order to respectively power a wind turbine 40 and a solar panel mounted on the tower 10.

Figure 6:
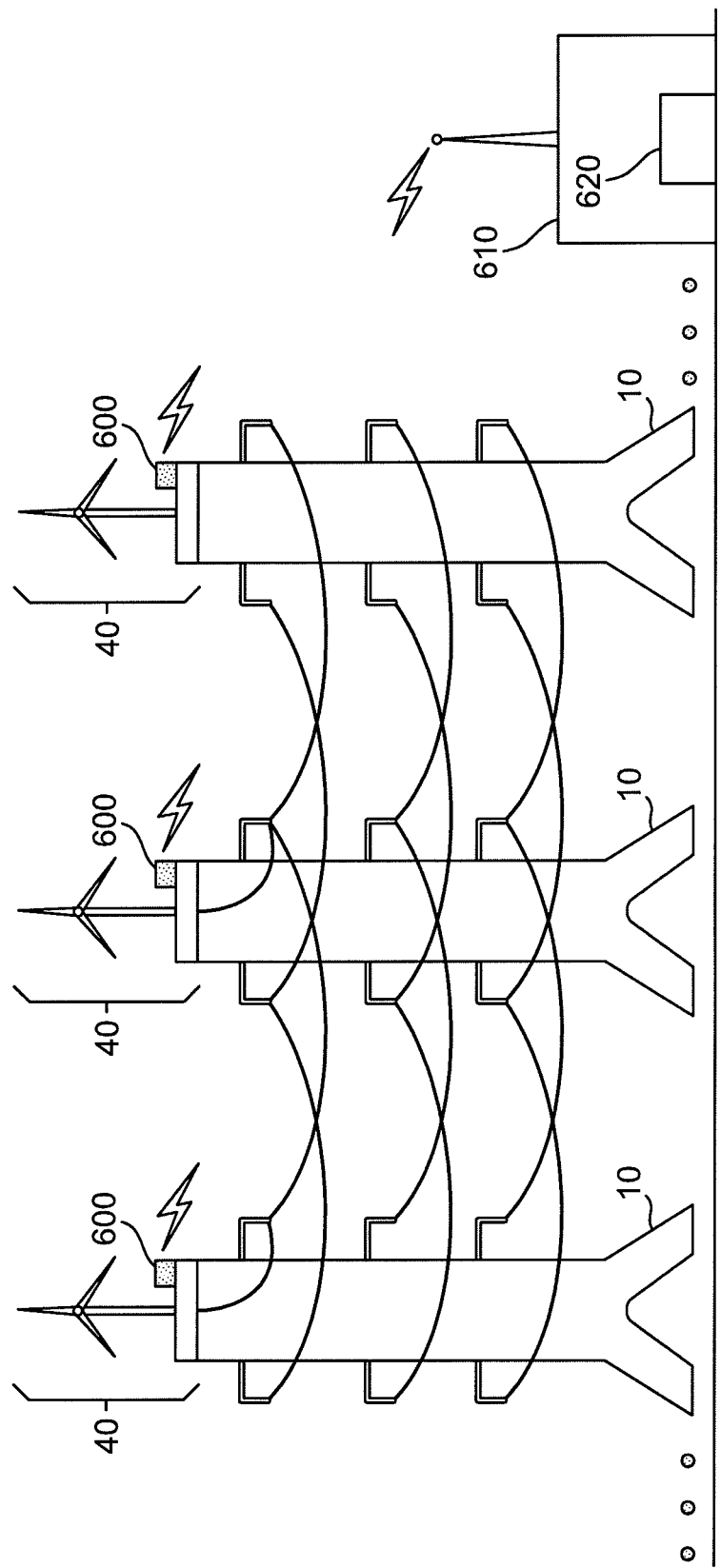
FIG. 6 illustrates a video surveillance and control system for use in controlling a natural power device at a tower, according to an exemplary embodiment.

According to a further exemplary embodiment, a centralized control system may be implemented in order to control the natural power device(s) on each transmission tower 10. For instance, this control system may include video cameras at various transmission towers 10 to conduct video surveillance on the natural power device(s) installed at such tower. FIG. 6 illustrates a video surveillance and control system for use in controlling the operation of maintenance of a natural power device at a transmission tower 10.

FIG. 6 shows a particular example in which a centralized control system is used to control wind turbines 40 mounted on top of various transmission towers 10. In this figure, a remote control and surveillance unit 600 is provided on each transmission tower 10, at or in proximity to the corresponding wind turbine 40. This remote control and surveillance unit 600 may include communications equipment for communicating with a central control facility 610. Such communications equipment may be used for transmitting video images to the central control facility 610, and also to receive control data or instructions from the central control facility 610. Although FIG. 6 illustrates that the remote control and surveillance unit 600 communicates wirelessly with the central control facility 610, it would also be possible to perform wireline communications.

Furthermore, the remote control and surveillance unit 600 of FIG. 6 may include a video camera positioned to capture video images of the wind turbine 40, to be transmitted to the central control facility 610 via the aforementioned communications equipment. Also, necessary components for controlling various aspects of the wind turbine 40. For instance, if the wind turbine 40 supports variable speeds for the wind blades 40A, the remote control and video surveillance unit 600 may be equipped to control the wind blade speed. As another example, if the generator 40B of the wind turbine 40 is able to produce different types of electrical outputs, the remote control and video surveillance unit 600 may be equipped to control which type of output is produced. In addition, it would be possible to equip the remote control and surveillance unit 600 with sensors or data-collecting equipment for obtaining data on the current status of the wind turbine 40 and/or its environment (current weather, etc.). This additional data could also be transmitted along with the images to the central control facility 600.

Referring again to FIG. 6, after the video images of the wind turbine 40 are transmitted from the remote control and video surveillance unit 600 to the central control facility 610, they may be processed by a computer system 620. This computer system 620 may comprise one or more general purpose computers programmed to analyze the images of the wind turbine 40 (along with any other data) transmitted by the remote control and surveillance unit 600, and generate instructions for controlling the wind turbine 40 and its generator 40B according to any appropriate control algorithm. It is also possible to have a user manning the computer system 620 to monitor the images and input appropriate control instructions.

Although FIG. 6 illustrates a particular example in which the remote control and video surveillance unit 600 is used for controlling the operation or maintenance of a wind turbine 40, it will be readily apparent that such a unit 600 could be reconfigured to control a solar panel 50 (not shown in FIG. 6) in a similar manner as described above. For instance, it is possible to position the remote control and video surveillance unit 600 on the transmission tower 10 at an appropriate location to capture images of the solar panel 50 for transmission to the central control facility 610. Further, such remote control and video surveillance unit 600 could include equipment suitable for controlling various operational aspects of the solar panel 50 (e.g., the type of electrical output produced) in response to control instructions issued by the computer system 620.

Furthermore, it is possible to include a battery 500 at the transmission tower 10 (as described above in connection with FIGS. 5A and 5B) in order to power the remote control and video surveillance unit 600. Alternatively, power for the remote control and video surveillance unit 600 may be obtained from a natural power device or one of the power lines connected to the tower 10.

According to another exemplary embodiment of the present invention, an electricity storage facility may be provided to store the electrical power produced by the natural power device(s) installed at a transmission tower 10. For example, such storage facility may be configured to store the electricity produced by a natural power device when the power demand is at an off-peak period.

Figure 7B:
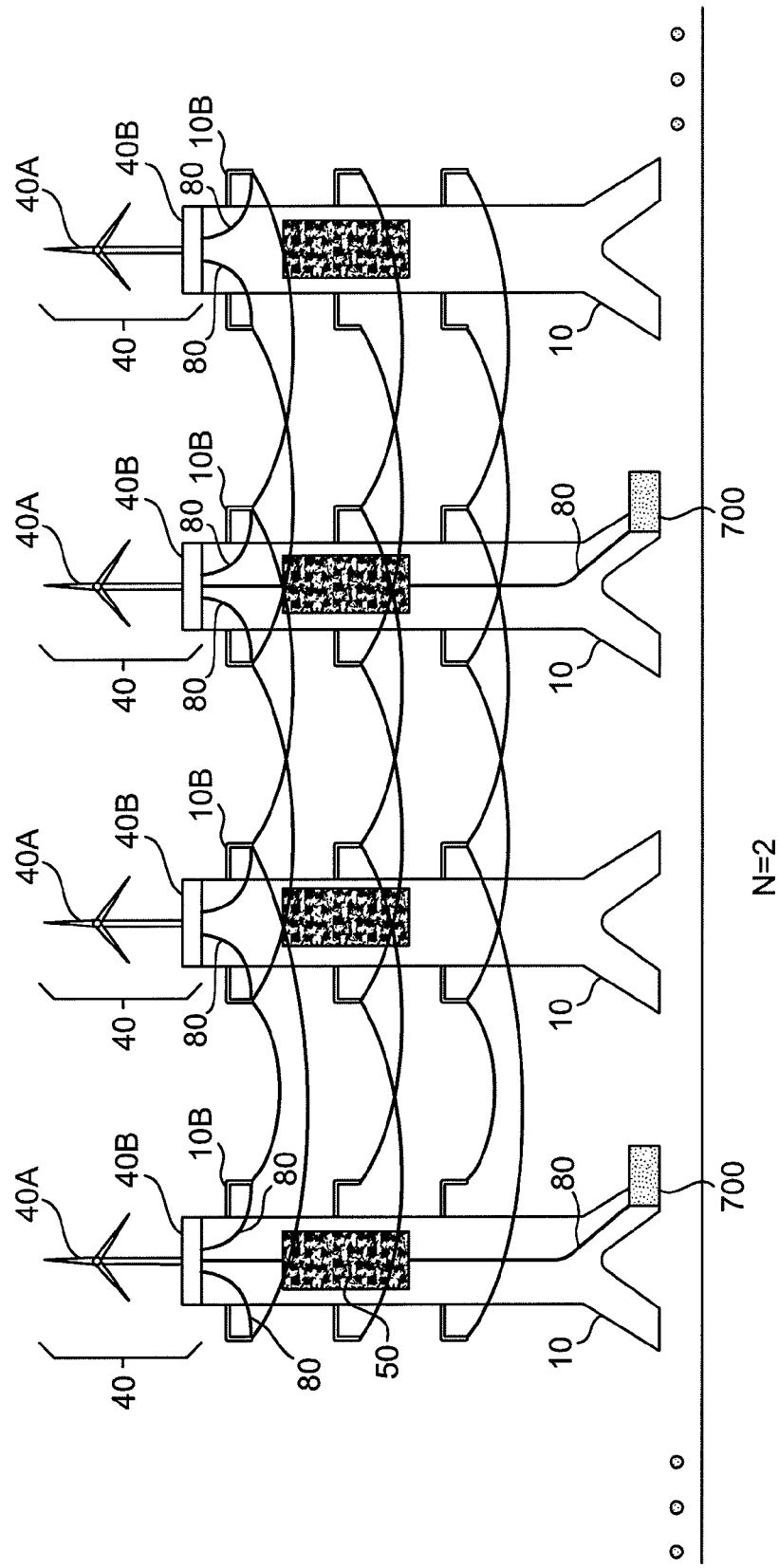

FIGS. 7A and 7B illustrate exemplary embodiments in which an electricity storage device 700 may be installed at a transmission tower 10 in order to store electricity generated by a natural power device. According to these embodiments, each electricity storage device 700 may be one of various types of storage facilities that are currently in commercial use to store wind-generated or solar-generated energy (e.g., at wind farms and solar farms). For instance, the electricity storage device 700 could be a battery 500 as described above in connection with FIGS. 5A and 5B. However, other types of energy storage facilities may be designed and manufactured for use as the electricity storage device 700, as will be contemplated by persons of ordinary skill in the art.

In one exemplary embodiment, as illustrated in FIG. 7A, an electricity storage device or facility 700 may be installed at each of a series of transmission towers 10 within a transmission network 20. One or more insulated wires 80, which convey electricity produced by a wind turbine 40 and/or a solar panel 50, is connected to the electricity storage device 700. Thus, excess energy which is produced by the wind turbine 40 and/or solar power 50, e.g., during off-peak periods, can be conveyed to and stored within the electricity storage device 700. The electricity storage device 700 may be installed at ground level at (or in proximate location to) the base of each transmission tower 10.

FIG. 7B, however, illustrates an alternative exemplary embodiment where an electricity storage device 700 is installed at every N-th transmission tower 10 (where N is an integer greater than one). According to this embodiment, each electricity storage device 700 may be configured to store the excess electricity generated by N transmission towers by natural power devices installed therein.

FIG. 7B shows a particular example where N=2, i.e., where an electricity storage device 700 is implemented at every second (2nd) tower 10 in each branch along the transmission network 20. However, it is possible to further decrease the number of electricity storage devices 700 installed in the transmission network 20 to, e.g., one electricity storage device 700 for every ten (10) transmission towers 10. Thus, the insulated wire(s) 80 running down to the electricity storage device 700, may also be electrically connected to one or more power lines transmitting natural-power electricity from other towers 10.

As another alternative to the exemplary embodiments of FIGS. 7A and 7B, however, the electricity storage device 700 need not be installed at any of the transmission towers 10 in the transmission network 20. Instead, it is possible to provide the electricity storage device 700 at a centralized location in the electrical grid 100. Referring again to FIG. 2, for example, a substation 24 is provided to receive the electrical power transmitted by the transmission grid 200, and transfer it to the distribution grid 300. Such substation 24 generally comprises a large facility, and could be adapted to further house an electricity storage device 700 of sufficient volume to store electricity, during off-peak periods, that is generated by the wind turbines 40 and/or solar panels 50 in the transmission towers 10. Of course, other alternative facilities, located either in the transmission grid 200 or the distribution grid 300, may be used to house the electricity storage device 700.

Figure 8:
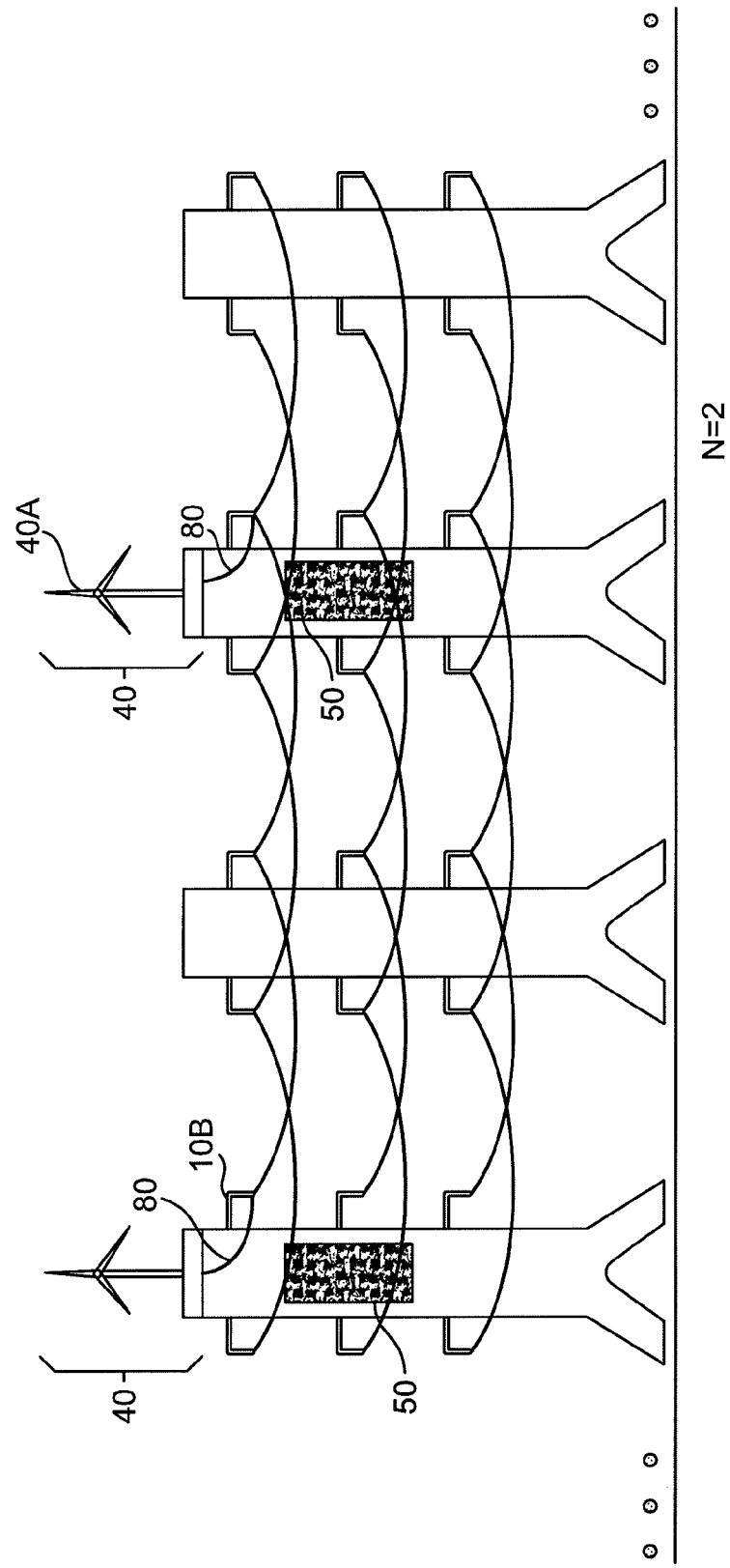
FIG. 8 illustrates an exemplary embodiment in which a natural power device is installed intermittently among transmission towers.

While FIGS. 5A, 5B, 6, 7A, and 7B illustrate each transmission tower 10 as having at least one natural power device, this is not a requirement. Instead, a natural power device may be intermittently dispersed among the transmission towers 10 in the transmission network 20. FIG. 8 shows a particular example of this. As shown in FIG. 8, a wind turbine 40 and a solar panel 50 are installed at every N-th (where N=2) transmission tower along a path in the transmission network 20. Of course, the value of N may be increased so that, for example, only every fifth (5th) or tenth (10th) transmission tower 10 is equipped with one or more natural power devices. Other variations are also possible. For instance, there is no requirement that both wind turbines 40 and solar panels 50 should be provided in the transmission network 20. For instance, it is possible only to install wind turbines 40 in the transmission network 20, in each or only a subset of the transmission towers 10 therein. In the same token, it would be possible only to install solar panels 50 in the transmission network 20.

With various aspects and embodiments having been disclosed hereinabove, the present invention covers any and all obvious variations thereof as will be readily apparent to those ordinarily skilled in the art. The various aspects and embodiments are provided for purposes of illustration and are not intended to be limiting, the true spirit and scope of the invention being defined by the accompanying claims.

The invention claimed is:

1. A system for transmitting and distributing electricity comprising:
one or more transmission towers supporting one or more transmission lines that supply electrical power or electrically-conducted signals to a distribution grid;
a natural power device that includes a wind turbine having a generator and for converting wind energy into electricity, the natural power device being electrically connected as a power source to at least one of the one or more transmission lines in order to supply the converted electricity to the distribution grid;
a first support plate including a plurality of tabs positioned on the periphery of the first support plate and a plurality of tabs positioned around an aperture in the first support plate, the plurality of periphery tabs mounted to a truss of the at least one of the one or more transmission towers at the top thereof;
a second support plate including a plurality of tabs positioned on the periphery of the second support plate and a plurality of tabs positioned around an aperture in the second support plate, the plurality of periphery tabs mounted to a truss of the at least one of the one or more transmission towers a certain distance below the first support plate; and
a support post extending vertically through respective apertures in the first and second support plates and mounted to the plurality of tabs positioned around each of the respective apertures,
wherein the wind turbine is mounted at said generator on one end of the support post extending above the top of the at least one of the one or more transmission towers.

2. The system according to claim 1, further comprising an interior pipe;
one or more insulated wires attached to a generator of the wind turbine; and
an insulated brace mounted on the at least one of the one or more transmission towers,
wherein the support post is a pipe of larger diameter than the interior pipe,
the interior pipe runs down from the generator through the interior of the support post, and
the one or more insulated wires run down from the generator through the interior pipe to the insulated brace where the at least one of the one or more transmission lines is attached.

3. The system according to claim 2, wherein the at least one of the one or more transmission lines runs from the insulated brace to another transmission tower, the one or more insulated wires transmitting the converted electricity to the at least one of the one or more transmission lines.

4. The system according to claim 3, further comprising:
a solar panel mounted on the at least one of the one or more transmission towers, wherein the solar panel is electrically connected to the one or more insulated wires.

5. The system according to claim 1, wherein the support post is anchored to ground or underground.

6. The system according to claim 1, wherein the natural power device comprises a solar panel.

7. The system according to claim 1, wherein the natural power device is powered by a battery that is mounted on or disposed proximate to the at least one of the one or more transmission towers.

8. The system according to claim 1, wherein the natural power device is selectively and individually controlled by a computer system.

9. The system according to claim 8, further comprising:
a camera mounted on the at least one of the one or more transmission towers,
wherein the camera is positioned to capture video images of the natural power device, and transmit the video images to the computer system.

10. The system according to claim 1, further comprising:
an electricity storage device that is electrically connected to the natural power device, and configured to store at least part of the converted electricity.

11. The system according to claim 10, wherein the electricity storage device is mounted on or disposed proximate to the at least one of the one or more transmission towers.

12. The system according to claim 10, wherein the electricity storage device is disposed at a substation between the transmission grid and the distribution grid.

13. The system according to claim 1, wherein the transmission lines are power lines.

14. The system according to claim 1, wherein the transmission lines are communication lines.

15. A method of obtaining and distributing electricity converted from natural power, comprising:
mounting a natural power device that includes a wind turbine having a generator to one or more transmission towers;
electrically connecting the natural power device as a power source to at least one of one or more transmission lines attached to the one or more transmission towers that supply electrical power or electrically-conducted signals to a distribution grid; and
converting with the natural power device, wind or solar energy into electricity and transmitting the converted electricity to the distribution grid via the at least one of the one or more transmission lines, the method further comprising for each of the one or more transmission towers:
mounting a first support plate including a plurality of tabs positioned on the periphery of the first support plate and a plurality of tabs positioned around an aperture in the first support plate to the transmission tower at the top thereof by attaching the plurality of periphery tabs of the first plate to a truss of the transmission tower;
mounting a second support plate including a plurality of tabs positioned on the periphery of the second support plate and a plurality of tabs positioned around an aperture in the second support plate to the transmission tower a certain distance below the first support plate by attaching the plurality of periphery tabs of the second plate to truss of the transmission tower;
mounting a support post on the transmission tower in a vertical direction by inserting the support post through the respective apertures in the first and second support plates and attaching the respective plurality of tabs positioned around the respective apertures to the support post such that one end of the support post extends above the top of the transmission tower;
mounting the wind turbine at said generator on top of the one end of the support post; and
attaching one or more insulated wires to the generator within the wind turbine, and running the one or more insulated wires through the interior of the support post to an insulated brace on the transmission tower to which the at least one of the one or more transmission lines is attached; and
transmitting the converted electricity via the one or more insulated wires to the at least one of the one or more transmission lines.

16. The method according to claim 15, further comprising for each of the one or more transmission towers:
mounting a solar panel on a transmission tower, and electrically connecting the solar panel to the one or more insulated wires.

17. The method according to claim 15, wherein the natural power device is a solar panel.

18. The method according to claim 15, further comprising for each of the one or more transmission towers:
conducting video surveillance on the natural power device with a camera mounted on the transmission tower; and
controlling operation of the natural power device by a computer-implemented controller based on the video surveillance.

19. The method according to claim 18, wherein the natural power device is a wind turbine, and the computer-implemented controller controls the speed of wind blades in the wind turbine.

20. The method according to claim 18, wherein the computer-implemented controller controls the output of electricity of the natural power device.

21. The method according to claim 15, wherein the one or more transmission towers are part of a transmission grid comprising a plurality of transmission towers, the method further comprising:
running the at least one of the one or more transmission lines from the one or more transmission towers to one or more other transmission towers in the transmission grid.

22. The method according to claim 21, further comprising:
installing a battery at one of the plurality of the transmission towers, the natural power device being powered by the battery.

23. The method according to claim 21, further comprising:
transmitting and storing at least part of the converted electricity to an electricity storage device.

24. The method according to claim 23, further comprising:
installing the electricity storage device at one of the plurality of transmission towers in the transmission grid.

25. The method according to claim 23, further comprising:
installing the electricity storage device at a substation between the transmission grid and the distribution grid.

26. The method according to claim 21, further comprising:
attaching additional natural power devices to respective ones of the one or more other transmission towers in the transmission grid, each of the additional natural power devices being configured to convert wind or solar energy into additional electricity to be transmitted on the at least one of the one or more transmission lines.

27. The method according to claim 26, wherein the additional natural power devices are attached in such manner that every N-th transmission tower between which the at least one of the one or more transmission lines run is provided with one of the natural power devices, N being an integer greater than 1.

28. The method according to claim 15, wherein the transmission lines are power lines.

29. The method according to claim 15, wherein the transmission lines are communication lines.

30. A transmission tower as part of a system connected to a distribution grid, the transmission tower comprising:
one or more transmission lines that supply electrical power or electrically-conducted signals to the distribution grid; and
a natural power device that includes a wind turbine having a generator for converting wind or solar energy into electricity, the natural power device being electrically connected as a power source to at least one of the one or more transmission lines in order to supply the converted electricity to the distribution grid,
a first support plate including a plurality of tabs positioned on the periphery of the first support plate and a plurality of tabs positioned around an aperture in the first support plate, the plurality of periphery tabs mounted to a truss at the top of the transmission tower;
a second support plate including a plurality of tabs positioned on the periphery of the second support plate and a plurality of tabs positioned around an aperture in the second support plate, the plurality of periphery tabs of the second plate mounted to a truss of the transmission tower a certain distance below the first support plate; and
a support post extending vertically through the respective apertures in the first and second support plates and mounted to the plurality of tabs positioned around each of the respective apertures,
wherein the wind turbine is mounted at said generator on one end of the support post extending above the top of the transmission tower.

31. The transmission tower according to claim 30, further comprising
an interior pipe;
one or more insulated wires attached to a generator of the wind turbine; and
an insulated brace where the at least one of the one or more transmission lines is attached,
wherein the support post is a pipe of larger diameter than the interior pipe, the interior pipe runs down from the generator through the interior of the support post, and the one or more insulated wires run down from the generator through the interior pipe to the insulated brace.

32. The transmission tower according to claim 31, further comprising:

a solar panel electrically connected to the one or more insulated wires.

33. The transmission tower according to claim 30, wherein the support post is anchored to ground or underground.

34. The transmission tower according to claim 30, wherein the natural power device comprises a solar panel.

35. The transmission tower according to claim 30, further comprising a battery that that is configured to power the natural power device.

36. The transmission tower according to claim 30, further comprising:

a camera positioned to capture video images of the natural power device, and configured to transmit the video images to a computer system which controls the natural power device.

37. The transmission tower according to claim 30, further comprising:

an electricity storage device that is electrically connected to the natural power device, and configured to store at least part of the converted electricity.

38. The transmission tower according to claim 30, wherein the transmission lines are power lines.

39. The transmission tower according to claim 30, wherein the transmission lines are communication lines.

* * * * *